(12) United States Patent
Scheibel et al.

(10) Patent No.: US 8,589,565 B2
(45) Date of Patent: Nov. 19, 2013

(54) CLIENT-SERVER SESSION PARALLELISM

(75) Inventors: Mark D. Scheibel, Seattle, WA (US); Marcus Gillette, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 12/785,525

(22) Filed: May 24, 2010

(65) Prior Publication Data

US 2011/0289222 A1    Nov. 24, 2011

(51) Int. Cl.
*G06F 15/16* (2006.01)
*H04W 36/00* (2009.01)

(52) U.S. Cl.
USPC .......................................... 709/227; 455/443

(58) Field of Classification Search
USPC ....................................................... 709/227
See application file for complete search history.

(56) References Cited

U.S. PATENT DOCUMENTS

| | | | |
|---|---|---|---|
| 5,740,371 A | 4/1998 | Wallis | |
| 6,085,247 A | 7/2000 | Parsons et al. | |
| 6,453,343 B1 | 9/2002 | Housel et al. | |
| 7,089,281 B1 * | 8/2006 | Kazemi et al. | 709/203 |
| 7,159,234 B1 * | 1/2007 | Murphy et al. | 725/87 |
| 7,224,691 B1 * | 5/2007 | Yeluri et al. | 370/394 |
| 7,792,787 B2 * | 9/2010 | Sincaglia et al. | 707/607 |
| 7,925,771 B1 * | 4/2011 | Ping et al. | 709/231 |
| 8,090,866 B1 * | 1/2012 | Bashyam et al. | 709/232 |
| 8,225,137 B2 * | 7/2012 | White et al. | 714/12 |
| 8,386,621 B2 * | 2/2013 | Park et al. | 709/228 |
| 2005/0021848 A1 | 1/2005 | Jorgenson | |
| 2008/0209050 A1 | 8/2008 | Li | |

FOREIGN PATENT DOCUMENTS

CN    101236567 A    8/2008

OTHER PUBLICATIONS

"Load balancing (computing)", Retrieved at << http://en.wikipedia.org/wiki/Load_balancing_%28computing%29 >>, Retrieved at : Apr. 23, 2010, pp. 1-5.
Burk, Philip L., "Jammin' on the Web—a new Client/Server Architecture for Multi-User Musical Performance", Retrieved at << http://www.transjam.com/info/transjam2000.pdf >>, Retrieved Date: Apr. 23, 2010, pp. 4.
Philopoulos, et al., "Experimental Study of Parallel Downloading Schemes for Internet Mirror Sites", Retrieved at << http://citeseerx.ist.psu.edu/viewdoc/download?doi=10.1.1.8.621&rep=rep1&type=pdf >>, 2001, pp. 5.

(Continued)

*Primary Examiner* — Joseph Avellino
*Assistant Examiner* — James Baron
(74) *Attorney, Agent, or Firm* — Ogilvie Law Firm

(57) ABSTRACT

Using client-server session parallelism (CSSP), a client device establishes multiple network communication sessions with different remote servers and requests the same unsegmented data item from each server. Whichever copy of the unsegmented data item is received earliest at the client device is provided to an application. The CSSP software may be part of a network stack, or it may be part of a particular application such as a browser or a media player. The servers are not necessarily CSSP-aware, but when they are, sessions may be load-balanced. CSSP sessions may also be transferred to other CSSP-aware servers in view of server loads, imminent server reboots, or other events. A CSSP client may notify a CSSP server of status information describing session(s) established at the client with other server(s), allowing the server to reallocate bandwidth to other clients when the CSSP client has sufficient alternate data sources.

20 Claims, 3 Drawing Sheets

(56) References Cited

OTHER PUBLICATIONS

"Download manager", Retrieved at http://en.wikipedia.org/wiki/Download_manager >>, no later than May 6, 2010, pp. 3.

"Multi-source", Retrieved at << http://en.wikipedia.org/wiki/Multi-source >>, no later than Mar. 31, 2010, pp. 1.

* cited by examiner

CLIENT-SERVER SESSION PARALLELISM

BACKGROUND

Downloading files and other data from a server on the internet or another network can take a substantial period of time. Download time may depend on factors such as the bandwidth used, the load on the server, the size of the data, and whether compression, encryption, or other encoding is involved. Multi-sourcing may decrease download time for large files by getting file data from two or more sources, e.g., from several mirrored servers.

In some cases, a program that performs multi-source downloads will connect to one server and begin downloading a portion of a desired file, then find another server hosting the same file and begin downloading another portion of the same file. A third server may be used to download a third portion of the file, and so on. To promote efficiency, such a program may segment the file so that different portions (segment groups) come from different servers; the user does not download the same part of the file twice. The program assembles the file segments, and the completed file can be obtained faster than it would have been by downloading it from a single source. Download managers and other programs that download relatively large files often use multi-source downloading.

SUMMARY

Client-server sessions may encounter delays in accessing a resource, unavailable services, and other challenges. In many cases, clients cannot reconnect to a functioning server until a DNS timeout, TCP timeout, or other period expires. Accordingly, latency, dropped traffic, and other adverse conditions can interfere with a user's desired experience.

Some embodiments describe herein provide client-server session parallelism to reduce or eliminate undesirable experiences caused by network communication difficulties during use of a web browser, an email client, a streaming media client, or another application. In some embodiments, a client device establishes a first network communication session on the client device with a first remote server, and also establishes a second session with a second server. The client requests a first copy of an unsegmented data item from the first server, within the first session, and also requests a second copy of the same item from the second server within the second session. The client does not segment the data item to request different portions (segment groups) from the different servers. Whichever copy of the unsegmented data item is received earliest at the client device is provided to an application. The software which manages the client-server session parallelism may be part of a network stack, or it may reside at a higher level, e.g., it may be embedded or plugged-in as part of an application.

A second unsegmented data item may be similarly obtained after requests to multiple servers in multiple sessions, either from the same server as the first item or from another server. That is, in some embodiments the server that won the race to provide the first item is not used exclusively thereafter; it continues to compete with other servers to provide requested data items.

Client devices may include desktop or portable computers, mobile phones, game consoles, and other networked devices. Unsegmented data items may take various forms, such as a media stream, a web page, a file whose size is at least 100 Kbytes, a file whose size is at least 500 Kbytes, or a file whose size is at least 1 Mbyte, for example. These file sizes are merely illustrative; a given embodiment may use client-server session parallelism for all data items, regardless of their size.

In some embodiments, only the client is aware that client-server session parallelism (CSSP) is being employed. In such cases, sessions may be stateless from the client application's point of view. In other embodiments, a server overall or at least an application on the server is aware of which sessions are part of a CSSP configuration. When the server overall is aware, CSSP sessions and non-CSSP sessions may be load-balanced, for example. CSSP sessions may also be transferred to other CSSP-aware servers in view of server loads, imminent server reboots, or other events. When the server overall is not CSSP-aware, but an application on the server is CSSP-aware, then load balancing with non-CSSP sessions may be unavailable but transfers to other servers may still be an option. Servers are said herein to be CSSP-aware when they are aware of CSSP, either at a partial level within a CSSP server application that deals only with CSSP sessions, or at an overall level that deals with both CSSP sessions and other sessions.

In some embodiments, CSSP clients communicate with CSSP-aware servers or server applications to coordinate downloads across server reboots and other events. For instance, a CSSP client may notify a CSSP server of status information describing session(s) established at the client with other server(s), allowing the server to reallocate bandwidth to other clients when the CSSP client has sufficient alternate data sources, for example.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
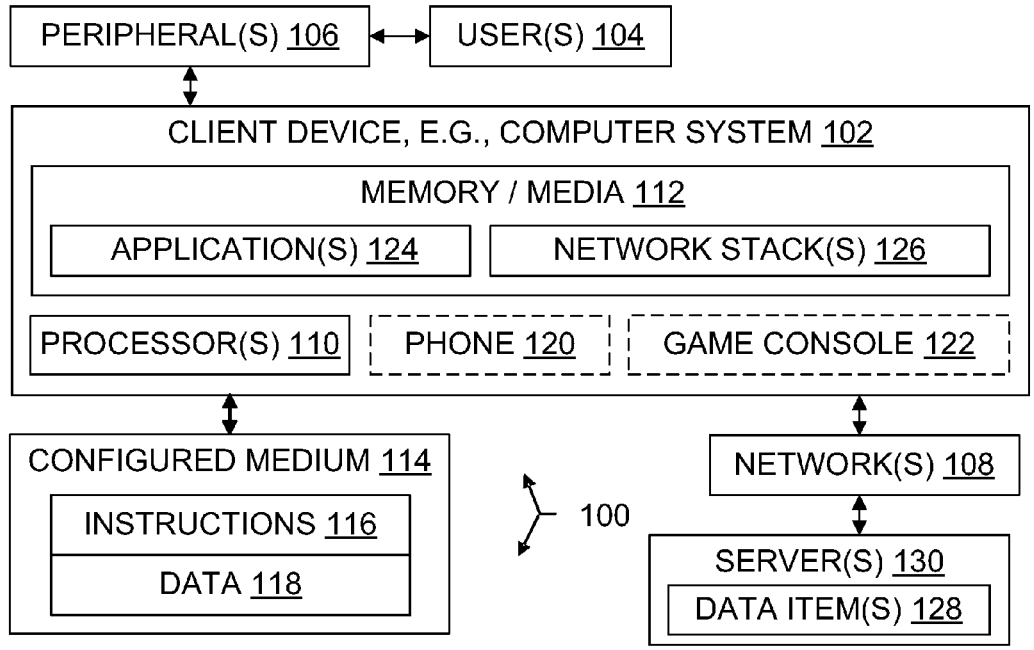
FIG. 1 is a block diagram illustrating a client device having at least one processor, at least one memory, at least one network stack supporting one or more applications, and other items in an operating environment which may be present on multiple network nodes, and also illustrating configured storage medium embodiments.

In an effort to reduce latency and other difficulties, some familiar approaches use disconnected cloud technologies, such as wide area load balancing, to direct network traffic generally to less heavily loaded IP addresses on a global network. These technologies are disconnected in the sense that the server or client in question are not making the load balancing decisions. Results of such technologies may be limited; a change in the performance or availability of the server or network location (or the entire end-to-end communication channel itself) during the session can adversely impact the client experience, but the load balancing mechanism does not recognize the issue, at least initially. After the load balancing mechanism recognizes the issue, steps taken by the mechanism may only benefit future sessions, leaving the current sessions in a degraded or failing state.

Some embodiments described herein provide tools and techniques for client-server session parallelism (CSSP) by which a client maintains multiple server sessions and chooses the best available session at any point in time. Awareness of CSSP sessions can be implemented on the client only, or in cooperation with a server side CSSP module. CSSP may facilitate better client performance and/or redundancy with networked applications. Some CSSP clients download two or more simultaneous streams. Some establish multiple, redundant sessions in order to reduce time to wait when falling back to alternative source(s).

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "server(s)" means "one or more servers" or equivalently "at least one server".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", or "communicating to" a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not, and may be a subsystem of a larger device 102, e.g., a mobile phone 120, game console 122, or other device. An operating environment may include one or more machines in a given computer system, which may be clustered, client-server networked, and/or peer-to-peer networked.

Human users 104 may interact with the computer system 102 by using displays, keyboards, microphones, joysticks, buttons, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The storage media 112 may be volatile memory, non-volatile memory, fixed in place media, removable media, magnetic media, optical media, and/or of other types of storage media (as opposed to propagated signal media). In particular, a configured medium 114 such as a CD, DVD, memory stick, flash card, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by streaming, binding, deployment, execution, modification, display, creation, loading, and/or other operations.

Applications 124, network stacks 126, other software, and other items shown in the Figures may reside partially or entirely within one or more media 112, thereby configuring those media. An operating environment may also include other hardware, such as phone 120 hardware components (microphone, speaker, screen, antenna, signal processor, etc.), game console 122 hardware (buttons, triggers, accelerometers, display, etc.), buses, power supplies, and graphics accelerators, for instance. An application 124 may retrieve/upload data item(s) 128 from/to server(s) 130, with the assistance of a network stack 126.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
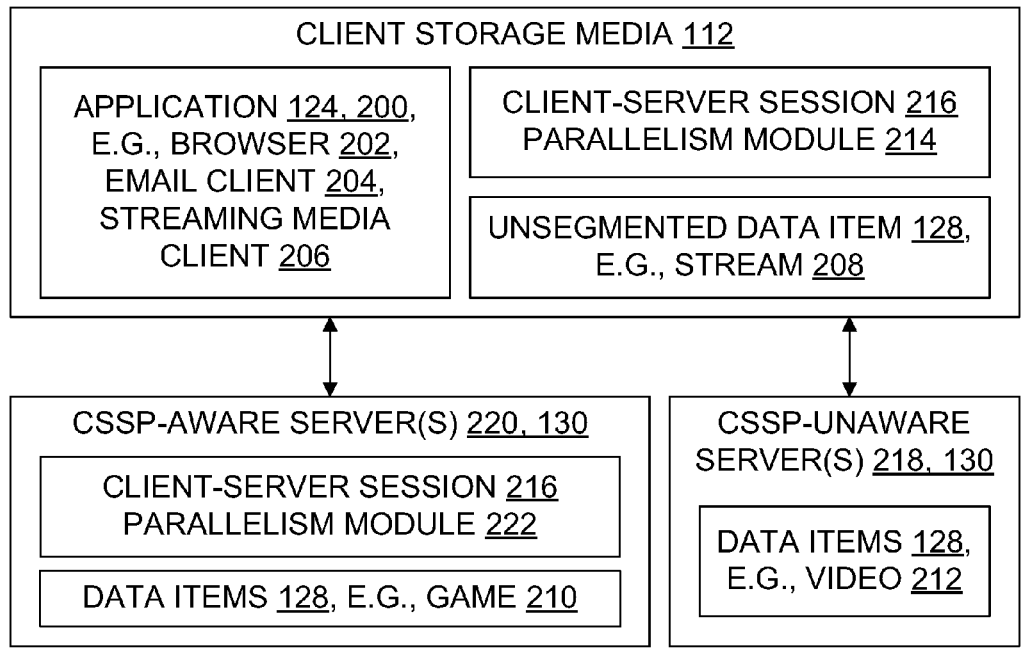
FIG. 2 is a data flow diagram illustrating aspects of client-server session parallelism in an example architecture.

FIG. 2 illustrates aspects of a client-server session parallelism (CSSP) architecture which is suitable for use with some embodiments. On a client device 102, an application 124 that downloads data items 128 resides in memory 112. For instance, the application 124 may be a CSSP-aware application 200 or a CSSP-unaware application, and may include a web browser 202, an email client 204, a streaming media client 206, and/or other application code. The data item(s) 128 may be streams 208, multimedia games 210, and/or video 212, for example, as well as files, feeds, and other forms of data. A CSSP module 214 on the client establishes multiple sessions 216 with servers 130. The servers may be unaware of CSSP, as with illustrated server 218, and/or servers which are aware of CSSP, as with illustrated server 220 which has a server CSSP module 222. In general, at least the client is CSSP-aware; a given configuration may or may not include CSSP-aware server(s) 220.

In some embodiments, a client device 102 includes at least one logical processor 110, and a memory 112 in operable communication with the logical processor(s). A client-server-session-parallelism (CSSP) module 214 in the form of circuitry, firmware, and/or software residing in the memory is operable to transform multiple remote copies of a data item into a single local copy as described herein. The CSSP module is operable to initiate multiple sessions 216 with multiple servers 130 requesting a given unsegmented data item 128 in each session. That is, the same data item 128 is request in each session 216, and the data item need not be segmented by the client into blocks or other segments to allocate different portions among the different servers for downloading. For example, in some embodiments, the client device 102 is configured with at least a portion of the unsegmented data item 128 in the memory, and the unsegmented data item includes a data stream 208, such as a video 212 (image and sound data) stream or a portion of a multimedia game 210.

In some embodiments, the client CSSP module 214 resides in a network stack 126, which is sometimes referred to as a "protocol stack" or "communications stack". In a stack 126 having media, transport, and application layers, for example, the CSSP module may operate in the transport layer. As a result, all applications 124 which use that stack 126 may transparently receive the benefits of CSSP, e.g., they may receive downloads faster without explicitly managing individual sessions. In some embodiments, an application calls an application-to-transport layer interface of a module 214 by simply specifying a domain name or other source of multiple server addresses, and an unsegmented data item 128 to download. The CSSP component of the network stack (another part of the module 214) then initiates multiple sessions 216 with multiple servers 130, requests the unsegmented item in each session, and delivers the first received unsegmented copy of the item to the requesting application 124.

With regard to the term "unsegmented", it will be understood that familiar network stacks break requested data items into packets for transmission, and that familiar memory management code may break requested data items and other data into pages to implement virtual memory. These operations do not create "segments" for present purposes; IP packets are not segments, and memory pages are not segments. Segmentation occurs at a higher level than packetization or paging, and for a different purpose. As used herein, a data item is "segmented" when it is divided into segments by code designed to download different segments of the data item from different sources and then reassemble the received segments in order to provide a complete copy of the data item. A data item is "unsegmented" for present purposes when segmentation is unnecessary, e.g., when all of the item is requested from multiple sources and receipt of multiple copies of the item occurs in normal operation.

In some embodiments, the CSSP module 214 resides in a particular application 124, 200. For example, the CSSP module 214 may be embedded in the code of an application that calls a familiar protocol stack 126. A CSSP module may also be implemented as a browser 202 plug-in, for example. In such cases, only the application in question will receive the benefits of the CSSP module 214.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
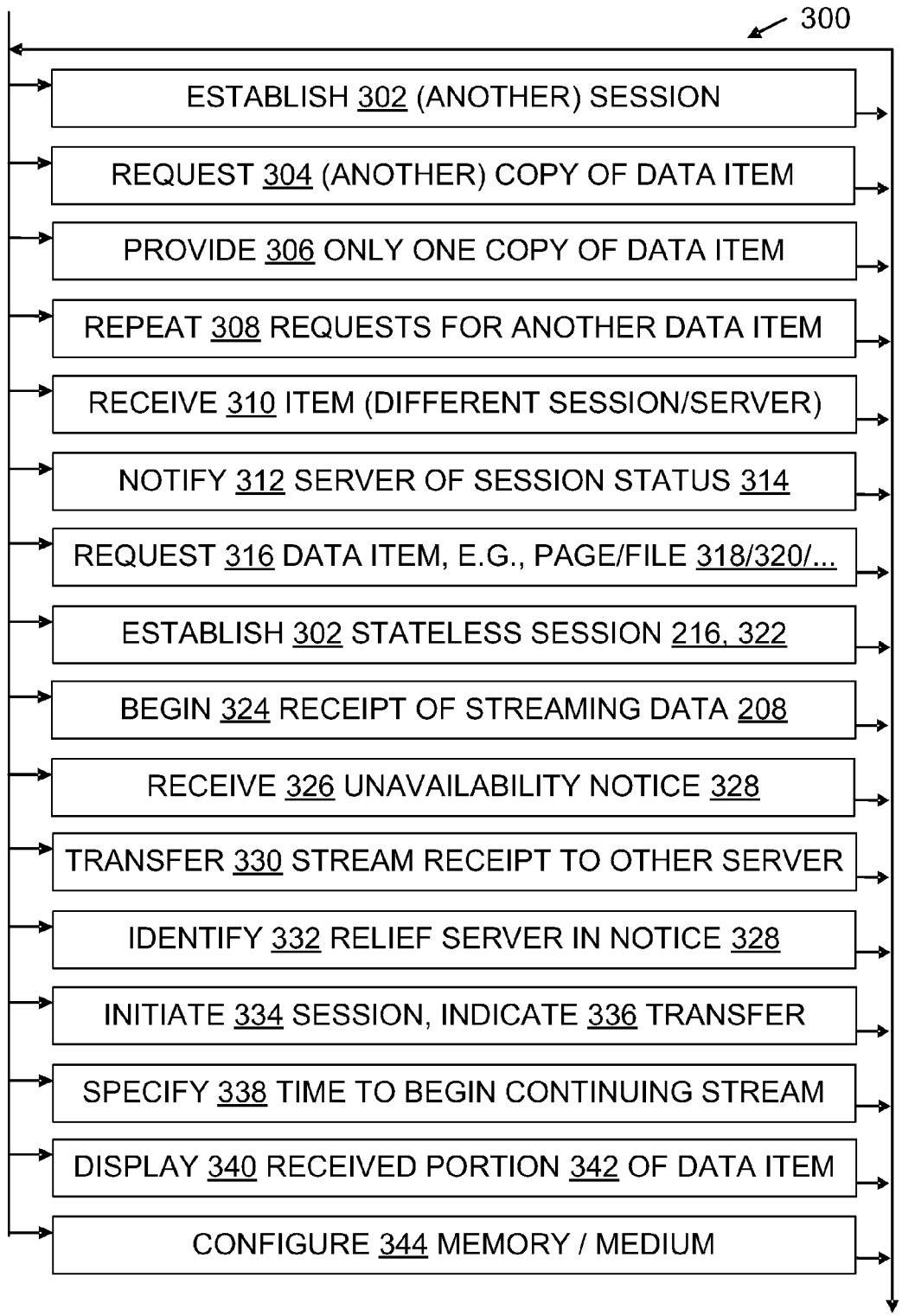
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by an application doing downloads under control of a script requiring little or no user input, where the application contains a CSSP module 214 or invokes a network stack CSSP module 214. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a session establishing step 302, an embodiment establishes a session 216 between a client device and a server. The session may be the client's first session with the server, or the client's first session requesting a given data item, or the instance of step 302 in question may have been preceded by an earlier instance of step 302 in which the client established another session, with the same or a different server, to request the same or a different data item. Step 302 may be accomplished using familiar session establishment mechanisms for establishing TCP sessions, OSI session layer sessions, or HTTP sessions, for example.

During an item requesting step 304, an embodiment requests a copy of an unsegmented data item 128 from a particular server 130 within a particular session 216. Step 304 may be repeated, requesting the same item 128 from another server, for example. Step 304 may be accomplished using familiar mechanisms, e.g., HTTP GET, or a request that a particular file be streamed, for example.

During an item providing step 306, an embodiment (and in particular a CSSP module 214 of an embodiment) provides a single copy of an unsegmented data item 128, to an application or other software that invoked the CSSP module 214. Step 306 may be accomplished by passing a buffer address, by making a bitwise copy, or by other familiar mechanisms for passing return values, for example.

During a request repeating step 308, an embodiment repeats step 304 but requests a different data item 128 than in the original request and/or makes the request to a different server.

During an item receiving step 310, an embodiment (and in particular a CSSP module 214 of an embodiment) receives from a server at least a portion of an unsegmented data item 128. Step 310 may be a repeat of an earlier receiving step 310, in which the item was received from a different server and/or within a different session. Step 310 may be accomplished using familiar mechanisms for receiving data transmissions over a network.

During a server notifying step 312, an embodiment (and in particular a CSSP module 214 of an embodiment) notifies a CSSP-aware server 220 (e.g., by notifying a CSSP-aware application or other module 222 in a server) of session status 314 for at least one session other than the present session. Session status may include, for instance, a session identifier, a server address, a client address, a session health indicator (e.g., healthy, timed out, slow, etc.), and an indicator of how much of the requested data item has been received within the session, for example. Step 312 may be accomplished using familiar server communication mechanisms adapted for CSSP control messages taught herein, for example.

During a particular item requesting step 316, an embodiment requests 304 or repeats 308 a request for an unsegmented data item. Step 316 is called out separately here in order to note several kinds of data items 128 that may be frequent subjects of requests 304, namely, web pages 318, files 320, streams 208, games 210, and video 212. However, step 304 is not limited to these particular examples.

During a stateless session establishing step 302, an embodiment establishes 302 a session 216 which is a stateless session 322 from the perspective of the client. Stateless sessions 322 occur, for example, in configurations in which none of the servers 130 are CSSP-aware.

During a receipt beginning step 324, an embodiment begins to receive a streaming data item 128. Step 324 may be accomplished using familiar mechanisms for receiving streams 208, in the context of CSSP as taught herein.

During an unavailability notice receiving step 326, an embodiment (and in particular a client CSSP module 214 of an embodiment) receives an unavailability notice 328 from a server CSSP module 222, indicating that the server will become unavailable to continue sending a data item 128. The notice 328 may give a cause for the unavailability, e.g., imminent reboot, and may give a time frame for the unavailability, e.g., sixty to one hundred seconds from now, or at 3:00 pm Pacific Standard Time today. The notice may identify 332 a relief server, that is, another server that will be available to continue sending the data item in the current server's absence. A leader server CSSP module 222 may send notices 328 indicating the unavailability of other servers which are follower servers 130. Steps 326, 332 may be accomplished using familiar mechanisms for protocol control communications, in the context of CSSP as taught herein.

During a transferring step 330, an embodiment transfers a stream 208 from a first server 220 to second server 220, e.g., from a server that is becoming unavailable per a notice 328 to a relief server identified 332 in the notice 328. The stream downloading does not start back at the beginning of the stream at the second server, but instead picks up close enough to the point of interruption that a user 104 watching the stream on the client device 104 experiences little or no perceptible disruption, or at least no unusual disruption in situations where playback halts for video buffering as a matter of course regardless of server transfers 330.

During a session initiating step 334, an embodiment initiates a session by establishing 302 a session with a relief server 220.

During a transfer indicating step 336, an embodiment indicates to a relief server 220 that the current session (e.g., the session now being established, or the session just established) is a transfer 330 from an unavailable server. For example, the client may specify 338 a time for the relief server to begin continuing transmission of the stream 208, either as an absolute time or as a relative time.

During a displaying step 340, an embodiment displays a received portion 342 of a data item 128. For example, a media player may display received video stream data, a browser may display a received web page, and so on. As used here, "display" includes sending output to a screen, speaker, game controller vibration unit, Braille controlled-rod device, or other human-perceptible output peripheral 106.

During a memory configuring step 344, a memory medium 112 is configured by a client CSSP module 214, server CSSP module 222, or otherwise in connection with client-server session parallelism as discussed herein.

The foregoing steps and their interrelationships are discussed in greater detail below, in connection with various embodiments.

Some embodiments provide a process for transforming multiple remote copies of a data item into a single local copy of the item. The process includes establishing 302 at a client device a first network communication session between an application running on the client device and a first remote server, and establishing 302 at the client device a second network communication session between the application running on the client device and a second remote server. Additional steps include requesting 304 from the first remote server, within the first network communication session and on behalf of the application, a first copy of an unsegmented data item, and requesting 304 from the second remote server, within the second network communication session and on behalf of the application, a second copy of the same unsegmented data item. The process provides 306 to the application only one copy of the unsegmented data item, namely, whichever copy of the unsegmented data item is received earliest at the client device.

As noted, network communication protocols divide data automatically in the form of frames, datagrams, and packets, for example. "Unsegmented" in this context means that the CSSP-using application is not dependent upon data segmentation. At least some embodiments do not segment files into blocks, but work instead with all streaming and networked communication.

Some embodiments include the process at the client device repeating 308 the requesting steps for a second unsegmented data item, and providing 306 to the application only one copy of the second unsegmented data item, namely, whichever copy of the second unsegmented data item is received earliest at the client device. In some cases, the copy of the first unsegmented data item that is provided 306 to the application was received 310 within a different session and from a different server than the copy of the second unsegmented data item provided to the application. That is, in some cases one of the sessions works better for one piece of data, and another session works better for another piece of data. Sometimes the client gets data from a server A in a session with A, and sometimes the client gets data from a server B in a session with B. In some cases, an initial part of an unsegmented data item such as a stream from server A reaches the client first, but then the flow of data from server A slows, and therefore CSSP starts providing data from server B where Server A left off.

In some embodiments, the client can send feedback to the CSSP-aware server by notifying 312 the server 220 of session status 314. Notification 312 can inform prioritization decisions made by the server. For example, if a bogged down server is notified that a CSSP-aware client has multiple adequate streams, then the server may either terminate the session it has with the client or prioritize other sessions (e.g., by adjusting the priority of the associated threads on the CPU) to clients that aren't CSSP-aware. Thus, in some embodiments the process includes notifying 312 at least one server of status information describing session(s) established at the client device with server(s) other than the server(s) that are being notified.

In some embodiments, the establishing steps 302, the requesting steps 304, the providing step 306, and the application all utilize the same logical processor 110 at the client device 102. That is, the application and the CSSP code can run on the same device. In alternative embodiments, the application runs on one device, and the CSSP code runs on a different device, such as a proxy server or a networking appliance.

In some embodiments, the requesting steps request 316 at least one of the following unsegmented data items 128: a media stream 208, a web page 318, a file 320 whose size is at least 100 Kbytes, a file 320 whose size is at least 500 Kbytes, a file 320 whose size is at least 1 Mbyte. These file sizes are merely illustrative. In some embodiments, for example, a file 320 of under 100 Kbytes would also be downloaded using CSSP.

Processes such as those discussed immediately above can be performed in client-only or client-server-cooperative scenarios. That is, steps such as steps 302-310 may be performed by a CSSP client communicating with a CSSP-aware server 220, with a CSSP-unaware server 218, or with both kinds of servers. A given data item could be requested both from aware and unaware servers 220, 218, for example. A stateless session, from the client perspective, implies an unaware server 218.

Other processes involve client-server-cooperative scenarios, in which a client is communicating with a CSSP-aware server to transfer an existing stream. For example, in some embodiments, the unsegmented data item 128 includes streaming data, and the process at the client device includes beginning 324 receipt of the streaming data from the first server within the first session, receiving 326 a notice 328 from the first server that the first server will become unavailable before transmission of the streaming data is complete, and in response to the notice, transferring 330 receipt of the streaming data to a session with another server.

In some embodiments, the notice 328 from the first server identifies 332 a server which will transmit the streaming data after the first server becomes unavailable. That is, the unavailability notice from the server that's shutting down says which server will take over stream transmission. As part of the server A shutdown process, for example, a CSSP server service may automatically notify all CSSP-aware connected clients to transfer their sessions to server B.

In some embodiments, transferring 330 receipt of the streaming data to a session with another server includes initiating 334 a new session with a server (other than the first server) and indicating 336 that an existing stream is being transferred. In some, transferring 330 receipt of the streaming data to a session with another server also includes specifying 338 a time to begin the continued stream. For example, a CSSP-aware media player may specify the time interval to begin the continued stream. A time may be specified in absolute or relative terms, e.g., as a particular point in time ("12 noon PST") or as an interval ("In 10 seconds" or "as soon as possible").

Some embodiments of a process for network communication utilize a device which has at least one logical processor in operable communication with at least one memory, and utilize at least two servers, each server having at least one logical processor in operable communication with at least one memory. Such a process may include establishing 302 a first network communication session between the client device and a first server, and establishing 302 a second network communication session between the client device and a second server. The client device requests 304 from the first server, within the first network communication session, a copy of an unsegmented data item, and requests 304 from the second server, within the second network communication session, a copy of the same unsegmented data item. At some point, if all goes sufficiently well, the client device receives 310 at least a portion of the unsegmented data item from at least one of the servers, and then the client device displays 340 the received portion. For example, a client device may receive and display streaming data as part of the unsegmented data item.

Some embodiments utilize three or more servers. For example, a process may establish 302 a third network communication session between the client device and a third server, and request 304 from the third server, within the third network communication session, a copy of the same unsegmented data item.

In some embodiments, the client device receives 326 a notice 328 that a server 220 is overloaded. In response to the notice, the client may transfer 330 to a session with another server. A notice 328 may arise from use of a server load balancer. For example, some embodiments shift traffic periodically in order to promote more efficient power consumption.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable storage media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as CSSP modules 214, 222, and/or redundant data requests for the same unsegmented data item 128 in different sessions 216, in the form of data 118 and instructions 116, read from a removable medium 114 and/or another source such as a network connection, to form a configured medium. The configured medium 112 is capable of causing a computer system to perform process steps for transforming multiple remote copies into a single local copy of a data item as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

In some embodiments, client-server session parallelism (CSSP) permits a client to maintain multiple server sessions 216 and to choose the best available session, based on specified criteria such as download latency, at different points in time. Sometimes CSSP takes place on only the client side, and sometimes CSSP occurs through cooperation and communication between a client device and a server application. A CSSP client can be implemented at a layer in the device's network stack 126, or in a specific client application, such as a browser 202, email client 204, or media player, a.k.a., streaming client 206. CSSP can be implemented for any network attached platform, including a mobile phone 120 or game console 122, for example, as well as laptops, desktops, and other computers. For some client-only scenarios, the application session is stateless. However, if the application requires a stateful session, then the client can select the best session in cooperation with the server.

CSSP can be implemented with only one active node and one or more passive nodes, or it can be implemented with two or more active and any number of passive nodes. Example One and Example Two below illustrate two active nodes while Example Three and Example Four illustrate one active and one passive node.

Figure 4:
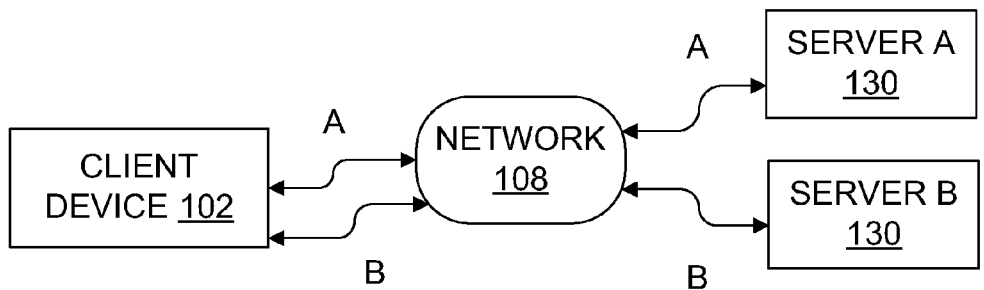
FIG. 4 is a data flow diagram illustrating client-server session parallelism in a configuration with two servers.
Figure 5:
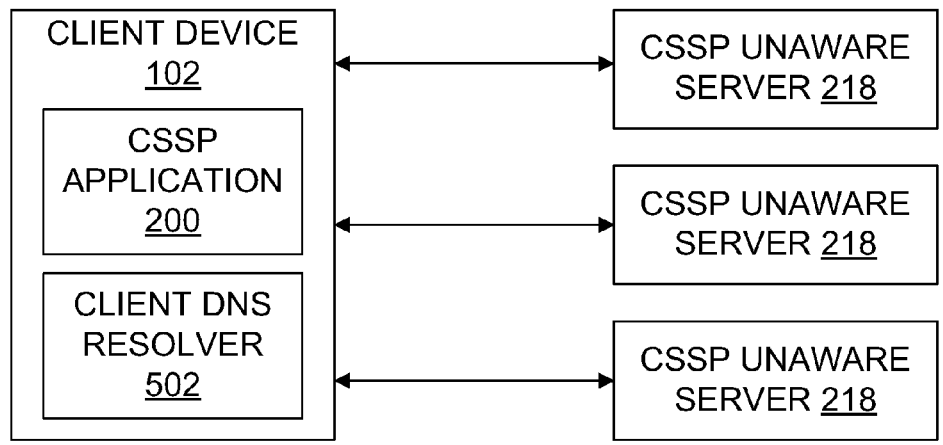

Example One is a client-only scenario illustrating web site availability during network interruption in the context of FIGS. 4 and 5. A user on the client computer 102 is using a web browser 202 to access a web site www dot a dot com (web site domain names are denoted herein with "dot" in place of periods, consistent with Patent Office procedures). To do so, the client performs a Domain Name System (DNS) lookup for the domain name www dot a dot com and receives two records in response, one indicating an IP address for the domain name at 1.2.3.4 and the other indicating an IP address for the same domain name at 1.5.6.7 (these are hypothetical domain names and addresses, for purposes of discussion only). The DNS lookup may be performed, for example, by a DNS resolver 502 on the client, or by other familiar DNS resolution mechanisms. As suggested by FIG. 5, in some configurations three or more DNS records may be provided, so that CSSP sessions 216 can be established with three or more servers.

The browser in this case is a CSSP-aware browser, and is configured to establish 302 a session with each of the 'A' and 'B' destination IP addresses. Server A responds first, so the CSSP-aware browser begins to render the response from server A while awaiting the response from server B. Shortly after the page 318 is displayed 340, unbeknownst to the user, a network failure causes the path to server A to become unavailable. The user clicks on a link to another page 318 hosted on the same web site. The CSSP-aware browser 202 sends another request 304 to both 'A' and 'B' IP addresses. This time, server B responds first because server A is no longer available. The CSSP-aware browser begins to render the new page without any interruption being caused by the unavailability of server A.

Example Two is a client-only scenario illustrating first page rendering performance during server overload, again in the context of FIG. 4. A user on the client computer is using a web browser to access the web site www dot a dot com. To do so, the client performs a DNS lookup and receives two records in response. The CSSP-aware browser 202 is configured to establish 302 a session 216 with each of the 'A' and 'B' destination IP addresses. In this hypothetical, server A responds first (see Table 1 below), so the CSSP-aware browser begins to render the response from server A while continuing to also load the page from server B in the background. After two kilobytes of data have been received 310, the data transfer slows due to overload on server A. The background page load from server B is promoted by the module 214 to become the primary rendering source. The total page load time is reduced from what would have taken 15.7 seconds to 8.6 seconds.

TABLE 1

| Server | Time to Initial Response | Time Until Last Byte was Received |
|---|---|---|
| A | 50 ms | 15.7 seconds |
| B | 300 ms | 8.6 seconds |

Figure 6:
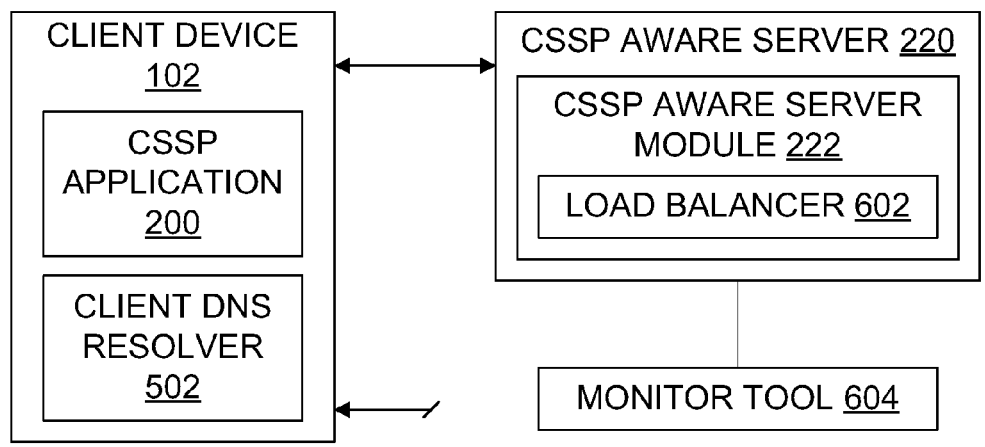
FIG. 6 is a data flow diagram illustrating client-server session parallelism in a configuration with at least an aware client and an aware server.

Example Three is a client and server cooperative scenario illustrating video performance during urgent server maintenance and a potentially seamless session transfer, in the context of FIGS. 4 and 6. A user on the client computer is using a media player (a.k.a. streaming media client 206) to access a streaming video from www dot a dot com. To do so, the client performs a DNS lookup and receives two or more records in response. The media player in this case is configured to send and receive control data through CSSP Management Protocol to manage the sessions. In some alternative embodiments, the media player is not aware of CSSP but the client computer network stack 126 includes a client CSSP module 214.

The media player begins 324 streaming data from server A. A situation arises requiring emergency maintenance on server A. As part of the shutdown process, the CSSP server service module 222 automatically notifies all CSSP-aware connected clients to transfer their sessions to relief server B. The user 104 continues to watch the streaming video as the session is transferred 330 to a new source, server B, in the background. The CSSP-aware media player performs the transfer by initiating 334 a new session request to server B, indicating 336 that it is transferring an existing stream, and specifying 338 the time to begin the continued stream. While this transfer can be expected to take some period of time (perhaps even 5-10 seconds), the stream display 340 should appear seamless to the user because the media player will continue to leverage a local buffer in its memory 112. In a variation, this example is modified to include use of a server load balancer 602. This variation would expand the control messages to convey load information and session status information, and may alter the transfer destination communicated via a CSSP management protocol to identify a less-loaded relief server.

Example Four is a client and server cooperative scenario illustrating data center power optimization via client redistribution, again in the context of FIGS. 4 and 6. Also, alternative embodiments are again possible on the client and the server(s) as to where the CSSP modules are located (application 200/ network stack 126; CSSP-aware overall server/CSSP-aware server application module). A third party tool 604 monitors data center power utilization. This tool can be configured to instruct the CSSP Server service module 222 to shift traffic periodically in order to more efficiently utilize power consumption between servers, racks, or data centers entirely.

More generally, embodiments may be helpful in a variety of scenarios. Without necessarily ruling out other scenarios, embodiments may accelerate rendering performance and/or improve reliability in browsers which download dozens or even hundreds of small files. Embodiments may also improve time-sensitive applications such as streaming applications which deal with thousands of small packets. Two of the many scenarios which may improve through use of an embodiment include a webpage that begins to render but appears to get stuck, and a video site access in which a video begins to download, but stops midway through and fails to recover. In these and other scenarios, embodiments may be of assistance.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer-readable storage device configured with data and with instructions to perform a process for network communication which transforms multiple remote copies into a single local copy of a data item, the process utilizing a client device which has at least one logical processor in operable communication with at least one memory, the process comprising the steps of:
    establishing at the client device a first network communication session between an application running on the client device and a first remote server;
    establishing at the client device a second network communication session between the application running on the client device and a second remote server;
    requesting from the first remote server, within the first network communication session and on behalf of the application, a first copy of a first unsegmented data item, wherein the first unsegmented data item is unsegmented in that it has not been subjected to segmentation at a network stack level above a network stack packetization level;
    requesting from the second remote server, within the second network communication session and on behalf of the application, a second copy of the first unsegmented data item; and
    providing to the application only one copy of the first unsegmented data item, namely, whichever copy of the first unsegmented data item is received earliest at the client device.

2. The computer-readable storage device of claim 1, wherein the process at the client device further comprises:
    repeating the requesting steps for a second unsegmented data item; and
    providing to the application only one copy of the second unsegmented data item, namely, whichever copy of the second unsegmented data item is received earliest at the client device;
    wherein the copy of the first unsegmented data item that is provided to the application was received within a different session and from a different server than the copy of the second unsegmented data item provided to the application.

3. The computer-readable storage device of claim 1, further comprising notifying at least one server of status information describing session(s) established at the client device with server(s) other than the server(s) that are being notified.

4. The computer-readable storage device of claim 1, wherein the requesting steps request at least one of the following first unsegmented data items: a media stream, a web page, a file whose size is at least 100 Kbytes, a file whose size is at least 500 Kbytes, a file whose size is at least 1 Mbyte.

5. The computer-readable storage device of claim 1, wherein the establishing steps establish sessions which are stateless from the application's point of view.

6. The computer-readable storage device of claim 1, wherein the first unsegmented data item includes streaming data, and the process at the client device further comprises:
    beginning receipt of the streaming data from the first server within the first session;
    receiving a notice from the first server that the first server will become unavailable before transmission of the streaming data is complete; and
    in response to the notice, transferring receipt of the streaming data to a session with another server.

7. The computer-readable storage device of claim 6, wherein the notice from the first server identifies a server which will transmit the streaming data after the first server becomes unavailable.

8. The computer-readable storage device of claim 6, wherein transferring receipt of the streaming data to a session with another server comprises initiating a new session with a server (other than the first server) and indicating that an existing stream is being transferred.

9. The computer-readable storage device of claim 8, wherein transferring receipt of the streaming data to a session with another server also comprises specifying a time to begin the continued stream.

10. A process for network communication which transforms multiple remote copies of a data item into a single local copy of the data item, the process utilizing a client device which has at least one logical processor in operable communication with at least one memory, and utilizing at least two servers, each server having at least one logical processor in operable communication with at least one memory, the process comprising the steps of:
    establishing a first network communication session between the client device and a first server;
    establishing a second network communication session between the client device and a second server;
    the client device requesting from the first server, within the first network communication session, a copy of an unsegmented data item, wherein the unsegmented data item is unsegmented in that it has not been subjected to segmentation at a network stack level above a network stack packetization level;
    the client device requesting from the second server, within the second network communication session, a copy of the same unsegmented data item;
    the client device receiving at least a portion of the unsegmented data item from at least one of the servers; and
    the client device displaying the received portion.

11. The process of claim 10, further comprising:
    establishing a third network communication session between the client device and a third server; and
    the client device requesting from the third server, within the third network communication session, a copy of the same unsegmented data item.

12. The process of claim 10, further comprising:
the client device receiving a notice that a server is overloaded; and
in response to the notice, transferring to a session with another server.

13. The process of claim 10, wherein the client device receives and displays streaming data as part of the unsegmented data item.

14. A client device comprising:
at least one logical processor;
a memory in operable communication with the logical processor(s); and
a client-server-session-parallelism module residing in the memory and operable to initiate multiple sessions with multiple servers requesting a given unsegmented data item in each session, wherein the given unsegmented data item is unsegmented in that it has not been subjected to segmentation at a network stack level above a network stack packetization level.

15. The client device of claim 14, wherein the client device is configured with at least a portion of the unsegmented data item in the memory, and the unsegmented data item comprises a stream.

16. The client device of claim 15, wherein the client device comprises a game console, the client device is configured with at least a portion of the stream in the memory, and the stream forms at least a portion of a multimedia game.

17. The client device of claim 15, wherein the client device comprises a mobile phone, the client device is configured with at least a portion of the stream in the memory, and the stream comprises video image and sound data.

18. The client device of claim 14, wherein the client-server-session-parallelism module resides in a network stack.

19. The client device of claim 14, wherein the client-server-session-parallelism module resides in an application.

20. The client device of claim 19, wherein the application comprises at least one of the following: a web browser, an email client, a streaming media client.

* * * * *